June 13, 1961 R. H. RANDALL 2,987,925
SPEED CONTROL UNIT
Filed Dec. 19, 1957 4 Sheets-Sheet 1
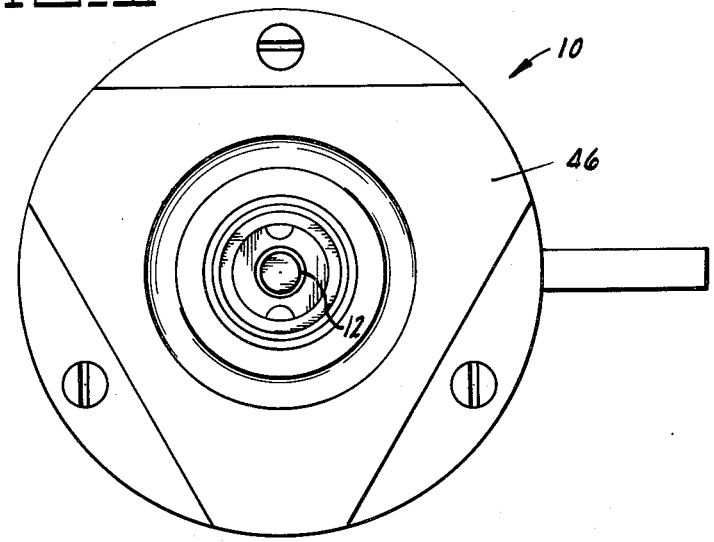
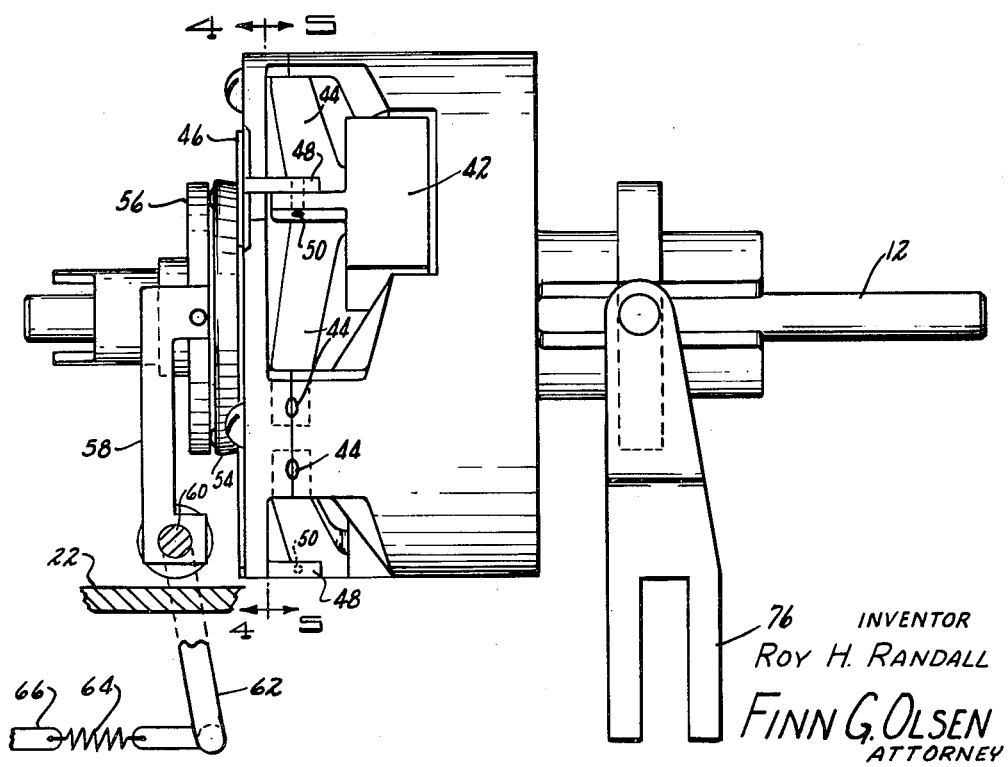
INVENTOR
Roy H. Randall
Finn G. Olsen
ATTORNEY

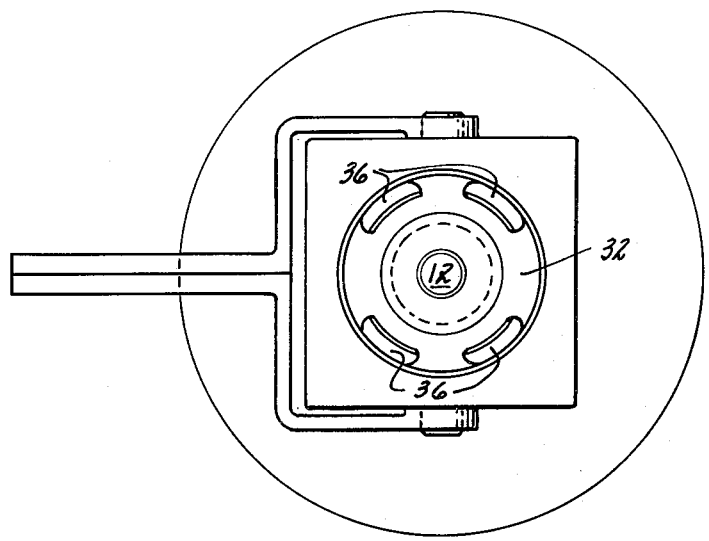
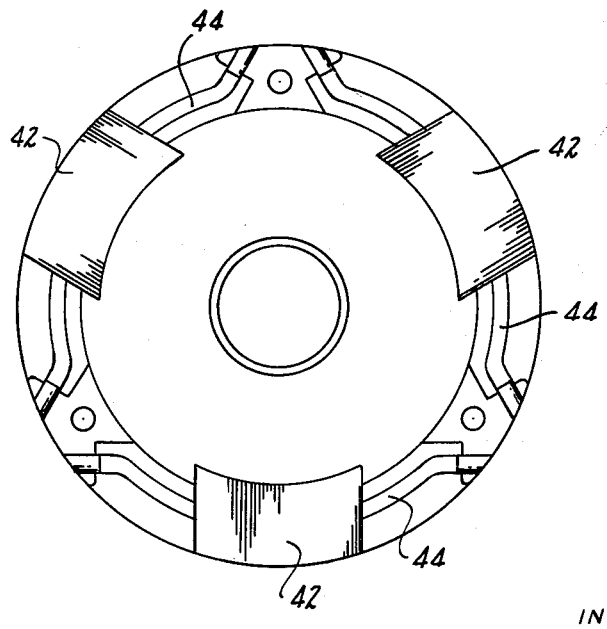

June 13, 1961 R. H. RANDALL 2,987,925
SPEED CONTROL UNIT
Filed Dec. 19, 1957 4 Sheets-Sheet 3

INVENTOR
Roy H. Randall
Finn G. Olsen
ATTORNEY

June 13, 1961 R. H. RANDALL 2,987,925
SPEED CONTROL UNIT

Filed Dec. 19, 1957 4 Sheets-Sheet 4

INVENTOR
Roy H. Randall
Finn G. Olsen
ATTORNEY

United States Patent Office 2,987,925
Patented June 13, 1961

2,987,925
SPEED CONTROL UNIT
Roy H. Randall, R.R. 2, Manchester, Mich.
Filed Dec. 19, 1957, Ser. No. 703,920
4 Claims. (Cl. 73—507)

The present invention relates to a governor, and more particularly to a speed control unit adapted to maintain constant speed of a prime mover at any of a plurality of speed settings under varying load conditions. This speed control unit is especially well suited for use in conjunction with gasoline or diesel type farm tractors, but may also be used with other prime movers.

The governors currently employed with farm tractors are generally of the type wherein flyweights, responsive to centrifugal forces, are operatively linked to the carburetor or fuel injection system for varying the fuel in direct response to changes in the engine speed. The farm tractors are designed to operate at a plurality of different speed settings, and the governor is intended to maintain the speed of the tractor constant for each throttle setting.

In practice, it is found that the governors presently used do not maintain constant engine speeds for each speed setting, but instead allow the engine speed to vary as much as ten percent from the intended speed as a result of adding or reducing the load on the engine. This is most commonly observed when the tractor is pulling implements over rolling or hilly ground.

The failure of the existing governors to maintain the engine speeds within closer limits is found to be detrimental, particularly in connection with the use of implements that may be pulled by the tractor and/or driven from the power-take-off of the tractor. Thus, an implement such as a combine functions best at a certain speed and if the governor allows the engine speed to vary as much as ten percent the most effective combining results are unobtainable.

As was previously stated, the existing governors with their flyweights are driven directly from the engine, and, in turn, the flyweights of the governor are directly linked to the fuel feed system. With this arrangement it is found that the speed variation will be as great as ten percent from the intended speed merely from load changes on the tractor.

It is an object of the present invention to overcome the defects of the prior art devices and to provide a speed control unit which is capable of maintaining engine speeds of tractors more constant under varying load conditions than was heretofore possible.

It is still another object of the present invention to provide a speed control unit of the foregoing character which is adjustable so that it can be set to be particularly sensitive to any of a series of speed settings of the engine, such adjustment being made automatically when the setting of the throttle is made.

Still another object of the present invention is to provide a speed control unit of the foregoing character which has an annular member mounted on the shaft which is driven by the engine, said annular member being mounted for relative rotation with respect to said shaft and being operatively connected to the fuel system of the engine for varying the fuel feed when relative rotation occurs between the driven shaft and said annular member.

It is still another object of the present invention to provide a speed control unit of the foregoing character wherein the relative number of turns that can be made between the driven shaft and the annular member is limited to approximately one and one-half turns after which the fuel feed to the engine will be held at a maximum or minimum depending upon whether the driven shaft is attempting to turn faster or slower than the annular member, thereby assuring very prompt responses of the fuel feed system to any changes in the engine speed resulting from variations in load.

It is still another object of the present invention to provide a speed control unit of the foregoing character wherein the annular member is rotated at a more rapid rate than said shaft when said shaft is being accelerated, thereby quickly increasing the feeding of fuel to the engine.

It is still another object of the present invention to provide a speed control unit of the foregoing character wherein flyweights are carried on said annular member and are responsive to centrifugal forces to aid in controlling the speed of the annular member relative to said shaft, thereby to provide a smooth functioning unit for regulating the fuel feed to the engine.

Other objects of this invention will appear in the following description and appended claims, reference being had to the accompanying drawings forming a part of this specification wherein like reference characters designate corresponding parts in the several views.

In the drawings:

FIGURE 1 is an end elevation of the speed control unit, removed from its casing;

FIGURE 2 is a side elevation of the speed control unit with fragmentary portions of the casing being shown;

FIGURE 3 is an end elevation of the speed control unit as viewed from the opposite end shown in FIGURE 1;

FIGURE 4 is a section taken on the line 4—4 of FIGURE 2;

Figure 5:
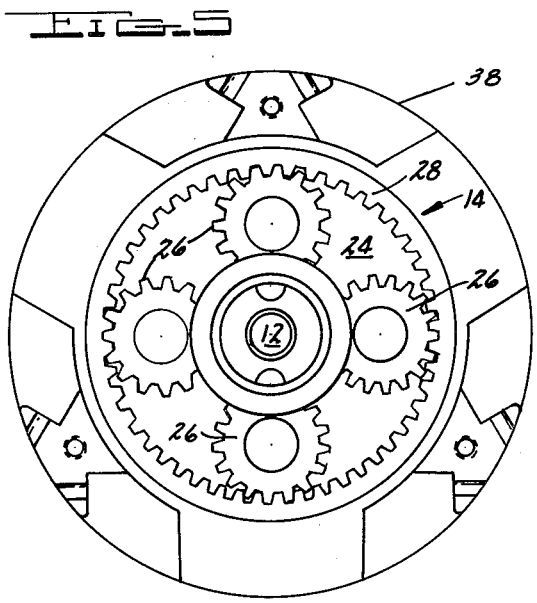
FIGURE 5 is a section taken on the line 5—5 of FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the invention will be given. The modification of the invention illustrated in FIGURES 1 to 6, inclusive, will first be described.

The speed control unit 10 has a shaft 12 which is adapted to be connected by suitable means to the drive shaft of the engine on which the speed control unit 10 is mounted. In this manner the shaft 12 will rotate at the same speed or at a speed proportional to the engine speed.

A planetary gear set 14 is mounted on shaft 12 to be rotated thereby. The gear set 14 has a sun gear 16 which has an integral sleeve 18 terminating in a pair of prongs 20 which are adapted to be received in apertures (not shown) in the end plate of the casing 22 to restrain the sleeve 18 and sun gear 16 from turning when the shaft 12 is rotated.

A planet carrier 24 is integrally attached to the shaft 12 for rotation therewith. The planet carrier 24 supports four planet gears 26 which are in mesh with sun gear 16 so that when shaft 12 rotates, the planet gears 26 will revolve around the sun gear 16 at the same rate. Encircling the planet carrier 24 is a ring gear member 28 which is retained in place by the snap ring 30 which seats in external and internal grooves, respectively, in the planet carrier 24 and the ring gear member 28. Thus, the ring gear member can rotate relative to the planet carrier 24. The teeth of the planet gears 26 are in mesh with the ring gear member 28, and the ratio of teeth between the gears is such that the ring gear member 28 will revolve five times for each four rotations of the shaft 12. Thus, the ring gear member 28 will always rotate at a more rapid rate than the shaft 12.

Formed as an extension of the planet carrier 24, and thereby constituting, in effect, an integral part of shaft 12, is a worm 32. If desired, this may be a single thread worm, and normally it will have approximately one and one-half turns for a purpose to be explained later.

A sleeve 34 having four fingers 36 fits around the worm 32 and is integrally attached to the clutch ring or annular clutch member 38 which is supported for rotation on the bearing surface 40 of the sleeve 18. Thus, the entire clutch ring 38 and its sleeve 34 can turn freely around shaft 12 and its integral planet carrier 24, and also it can turn freely around the stationary sun gear 16.

Figure 6:
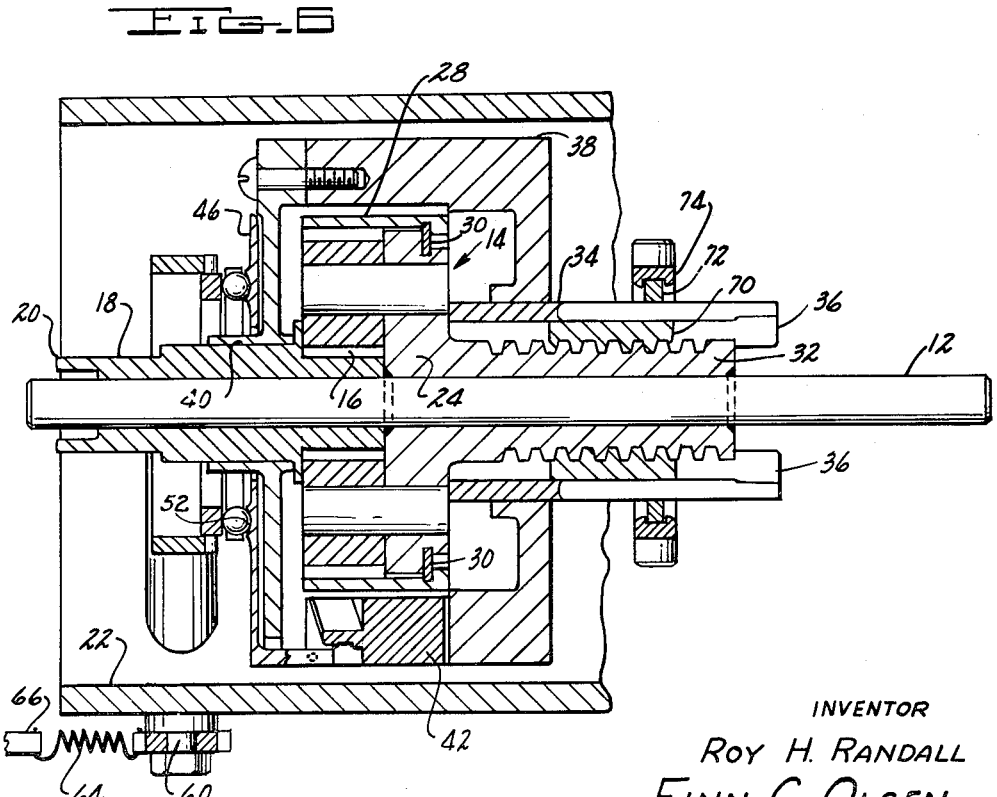
FIGURE 6 is a longitudinal section of the speed control unit with certain parts of the casing and control linkages being shown.

There are two mechanical connections that can be made to cause rotation of the annular clutch member 38. The first includes the three clutch elements 42 which also function as flyweight members in response to centrifugal forces caused by rotation of the annular clutch member 38. The clutch elements 42 are pivotally mounted on the pivot arms 44 so that the centrifugal forces will urge the clutch elements radially outwardly. As shown in FIGURES 2 and 6, the pivot arms 44 are mounted at their ends in the annular clutch member 38. Spring means oppose the action of centrifugal forces on the clutch elements and urge the clutch elements to pivot radially inwardly.

Such spring means includes an axially slidable disk 46 which is carried on annular clutch member 38 for rotation therewith. The disk 46 has three arms 48 extending toward the clutch elements 42 and which are pivotally connected at 50 thereto. Thus, the disk 46 is movably held to clutch member 38 by the arms 48, pivotal connection 50, and pivotal arms 44. When the disk 46 and its arms 48 are moved to the right, as seen in FIGURES 2 and 6, the linkages described will cause the clutch elements 42 to pivot radially inwardly, and conversely, when the clutch elements 42 are urged radially outwardly by centrifugal forces, the linkages will move the disk 46 to the left.

The illustrated embodiment of the invention is designed so that the clutch elements 42 will be urged inwardly at all times by a suitable spring. This is accomplished by means of a roller bearing follower 54 that is adapted to follow in the annular groove 52 formed in the outer face of disk 46. An annular trunnion member 56 fits against the ball bearing follower 54 and is connected to an arm 58, which, in turn, is pivotally connected to the pin 60 in casing 22. Arm 58 is secured to pin 60 so that the latter turns on pivotal movement of arm 58. Also rigidly connected to pin 60 is the arm 62 so that movement of arm 58 will be transmitted to arm 62 and vice versa. A suitable spring 64 is connected to arm 62 and to a control rod 66 urging the arm 62 to pivot clockwise as viewed in FIGURE 2. This has the effect of urging arm 58 in a clockwise direction around pin 60, and thereby urging disk 46 to the right as seen in FIGURE 2. Such movement of disk 46 will pivot clutch elements 42 inwardly as was previously described.

It is found desirable to control the spring pressure tending to urge the clutch elements 42 inwardly. For this purpose the control rod 66 is longitudinally movable to vary the pressure exerted through spring 64 to urge the clutch elements 42 radially inwardly. Normally, the control rod 66 will be connected to the control means for setting the speed at which the engine is intended to be driven, and for reasons which will become evident hereafter, it is desirable to be able to vary the effective spring pressure in relation to the intended speed of the engine.

The purpose for urging the clutch elements 42 radially inwardly will now be explained. As previously stated, the ring gear member 28 will rotate more rapidly than the shaft 12 because of the gear ratios present in the planetary gear set 14. The outer surface of the ring gear member 28 will be frictionally engaged by the inner surfaces of the clutch elements 42 when the latter are spring urged into their innermost positions. This will have the effect of driving the annular clutch member 38 at the same speed as the ring gear member 28, or in other words, at a faster rate than the rate of revolution of the shaft 12. Such driving relationship between ring gear member 28 and annular clutch member 38 will exist only so long as the centrifugal forces acting on clutch elements 42 do not pivot the latter outwardly against the pressure exerted by the spring 64 and control rod 66. Thus, the first mechanical connection that can be made to cause rotation of annular clutch member 38 as a result of turning of shaft 12 extends from shaft 12 through planetary gear set 14 and from the outer friction surface of the ring gear member 28 through the clutch elements 42 to the body of annular clutch member 38.

The second mechanical connection that exists between these parts includes the worm 32, which is integrally secured to shaft 12, and the sleeve 34 which is made an integral part of annular clutch member 38. Positioned on the worm 32 is an internally threaded member 70 which corresponds to a rack. The rack member 70 has a ring 72 extending radially outwardly and having four holes through which the four fingers 36 of sleeve 34 can pass. Thus, the rack member 70 can move longitudinally of the sleeve 34, but cannot rotate relative thereto. Thus, when shaft 12 is rotated, and when no other forces are influencing the rotation of the integral annular clutch member 38 and the sleeve 34, the rack member 70 will move longitudinally to one or the other end of its permitted travel on worm 32, after which the shaft will drive the annular clutch member 38 at the same rate of rotation as that of the shaft 12. Mounted on the ring 72 is an annular slip ring 74 with trunnions for connection to a linkage 76 to the fuel system of the engine. It will be readily understood that such linkage 76 can vary the fuel feed in accordance with longitudinal movement of the rack 70 and its associated slip ring 74.

In operation, the first mechanical connection between the shaft 12 and the annular clutch member 38 normally will dominate, particularly in all operations of the internal combustion engine where it is desired to increase the engine speed either during a starting operation or when the engine seeks to slow down because of an overload, or the like. It will be apparent that under these circumstances the setting of the control rod 66 and the resulting spring pressure acting on clutch elements 42 will cause the latter to frictionally engage the outer surface of the ring gear member 28. This will cause the annular clutch member 38 to turn at a more rapid rate than the shaft 12, and the relative rotation between member 38 and shaft 12 will cause the rack 70 and its associated slip ring 74 to maintain a position to the left end of the permitted travel on worm 32. This position of slip ring 74 will assure maximum fuel feed for the desired speed setting of the engine. Under these operating conditions the clutch elements 42 will in effect be dragged on the friction surface of ring gear member 28, and when the rack 70 has reached the end of travel the annular clutch member 38 will be able to rotate only as fast as the shaft 12.

When the operator reduces the speed of the engine, the speed of shaft 12 will be reduced the same amount. At the same time the position of control rod 66 will be changed reducing the spring pressure on the clutch elements 42. This will have the effect of allowing them to be more readily subject to the centrifugal forces resulting in such clutch elements 42 being pivoted outwardly so they they will no longer frictionally engage the ring gear member 14 and the latter will then not act to drive the annular clutch member 38. This will have the effect of reducing the speed of the annular clutch member 38 until the new spring pressure set for the new desired engine speed has had an opportunity to take effect, thereby again allowing the first mechanical connection to dominate and keep the annular clutch member turning at a maximum constant speed.

Thus, it can be seen that it is the speed differential between the annular clutch member 38 and the shaft 12 which governs the setting of the slip ring 74 and its associated fuel feed control linkages. In order to make this a very sensitive device it has been found that the worm 32 may have a thread with only one and one-half turns. The maximum speed differential between annular clutch member 38 and shaft 12 can then not be more than one and one-half revolutions before the slip ring 74 and its associated fuel feed control linkages have been moved to one extreme or the other. This assures quick response and smooth operation.

It is contemplated that other mechanical connections may be inserted between the shaft 12 and the annular clutch member 38 to provide speed differentials between these members whereby the slip ring 74 and the associated fuel feed control linkages may be actuated.

Figure 7:
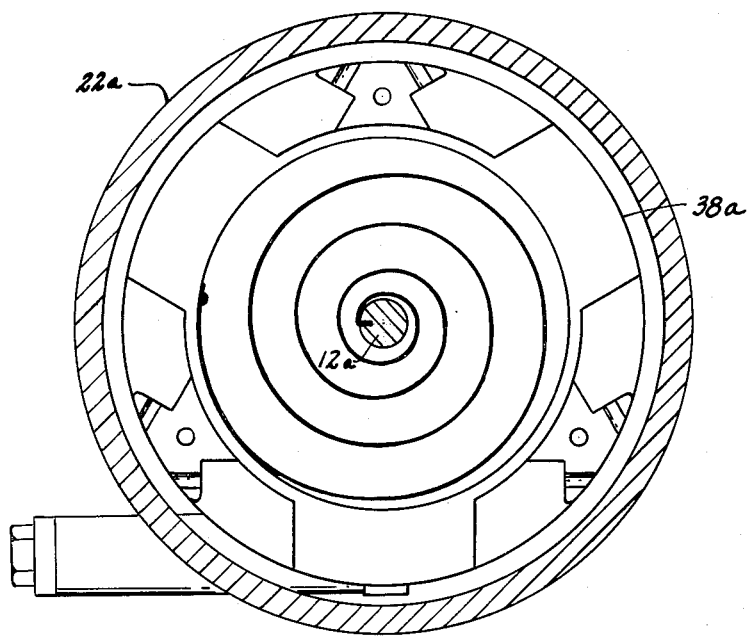
FIGURE 7 is a section of modified form of the invention corresponding to the section illustrated in FIGURE 5 and showing the casing in section.

One such modification is shown in FIGURE 7 wherein the planetary gear set 14 has been eliminated and in place thereof is a spiral spring. In this embodiment the clutch elements (not shown in FIGURE 7) will have their outer surfaces adapted to engage an annular friction surface of casing 22a. The variation in spring pressure on the clutch elements and the breaking action on the inner surface of the stationary surface will effect speed differentials between the annular clutch member 38a and the shaft 12a so that the slip ring 74 and the associated fuel feed control linkages will respond to slight speed changes to vary the fuel feed to the engine.

Having thus described my invention, I claim:

1. A speed control unit for maintaining the speed of an internal combustion engine substantially constant under varying load conditions, comprising a shaft adapted to be driven by said internal combustion engine; a planetary gear set mounted on said shaft with the sun gear adapted to be held stationary when the shaft is rotated, the carrier for the planet gears connected to said shaft for rotation therewith, and the ring gear in mesh with the planet gears to be turned at a greater rate than said shaft when the latter is rotated; a clutch ring encircling said planetary gear set and supported on said shaft for rotation relative to said shaft, said clutch ring carrying a plurality of clutch elements pivotally mounted so as to engage said ring gear frictionally when urged in one direction and to disengage from said ring gear when centrifugal forces urge them in the other direction; a common spring means operatively connected to said clutch elements urging said elements into frictional engagement with said ring gear so that said clutch ring will be rotated at a greater rate than said shaft; a worm and rack arrangement having its worm and rack directly connected respectively to said shaft and said clutch ring so that rotation of the clutch ring relative to the shaft will effect immediate longitudinal movement of said rack; and means connected to said rack and adapted to be connected to the fuel system of said engine so that the quantity of fuel fed to the engine is a function of the position of said rack.

2. A speed control unit for maintaining the speed of an internal combustion engine substantially constant at various speed settings under varying load conditions, comprising a drive shaft adapted to be driven by said internal combustion engine; a planetary gear set mounted on said shaft with the sun gear adapted to be held stationary when the shaft is rotated, the carrier for the planet gears connected to said shaft for rotation therewith, and the ring gear in mesh with the planet gears to be turned at a greater rate than said shaft when the latter is rotated; a clutch ring encircling said planetary gear set and supported on said shaft for rotation relative to said shaft, said clutch ring carrying a plurality of clutch elements spring biased by a common spring means into friction engagement with said ring gear for urging said clutch ring to rotate faster than said shaft and responsive to centrifugal forces to disengage from said ring gear when said clutch ring rotates above a predetermined speed; the spring biasing means of said clutch elements including means for varying the spring pressure acting against said clutch elements to correspond with changes in setting of the speed at which the engine is to operate; a worm and rack arrangement having its worm and rack directly connected respectively to said shaft and said clutch ring so that rotation of the clutch ring relative to the shaft will effect immediate longitudinal movement of said rack; and means connected to said rack and adapted to be connected to the fuel system of said engine so that the quantity of fuel fed to the engine is a function of the position of said rack.

3. A speed control unit for maintaining the speed of an internal combustion engine substantially constant at various speed settings under varying load conditions, comprising a drive shaft adapted to be driven by said internal combustion engine; a planetary gear set mounted on said shaft with the sun gear adapted to be held stationary when the shaft is rotated, the carrier for the planet gears connected to said shaft for rotation therewith, and the ring gear in mesh with the planet gears to be turned at a greater rate than said shaft when the latter is rotated; a clutch ring encircling said planetary gear set and supported on said shaft for rotation relative to said shaft, said clutch ring carrying a plurality of clutch elements and a common spring means spring biasing said clutch elements into friction engagement with said ring gear for urging said clutch ring to rotate faster than said shaft and responsive to centrifugal forces to disengage from said ring gear when said clutch ring rotates above a predetermined speed; the spring biasing means of said clutch elements including means for varying the spring pressure acting against said clutch elements to correspond with changes in setting of the speed at which the engine is to operate; and other means having two relatively movable elements rigidly connected respectively to said clutch ring and to said shaft for indicating instantaneously when said clutch ring is turning either faster or slower than said shaft, said other means being adapted to be connected to the fuel system of said internal combustion system for governing the feed of fuel to the engine in accordance with the indicating position of said other means.

4. A speed control unit for maintaining the speed of an internal combustion engine substantially constant at various speed settings under varying load conditions, comprising a drive shaft adapted to be driven by said internal combustion engine; an annular clutch member coaxially supported on said shaft for rotation relative thereto; a plurality of clutch elements pivotally mounted on said annular clutch member and adapted to be pivoted in one direction in response to centrifugal forces and in the other direction in response to spring pressure; common spring means operatively mounted to urge said clutch elements as a unit in said other direction and including means for changing the pressure exerted on said annular clutch member in accordance with the speed setting of said engine; means mounted on said shaft within said annular clutch member and operably associated with said annular clutch member for urging said annular clutch member circumferentially to increase its speed when the speed of said shaft is decreased by an added load on the engine, the last-named means comprising a planetary gear set having its sun gear held against rotation and its ring gear in position to be engaged by said clutch elements; and other means having two relatively movable elements rigidly connected to said annular clutch member and said shaft respectively for indicating when said annular clutch member is turning either faster or slower than said shaft, said other means being adapted to be connected to the fuel system of said internal combustion system for governing the feed of fuel to the engine in accordance with the indicating position of said other means.

References Cited in the file of this patent

UNITED STATES PATENTS

| | | |
|---|---|---|
| 1,265,134 | Sundt | May 7, 1918 |
| 1,524,445 | Manicki | Jan. 27, 1925 |
| 1,673,843 | Plass | Jan. 19, 1928 |
| 2,182,385 | Neracher et al. | Dec. 5, 1939 |
| 2,505,220 | Sparrow | Apr. 25, 1950 |
| 2,679,296 | Morain | May 25, 1954 |

FOREIGN PATENTS

| | | |
|---|---|---|
| 12,280 | Great Britain | Aug. 25, 1888 |
| 298,691 | Great Britain | Oct. 18, 1928 |
| 332,311 | Germany | Jan. 27, 1921 |